(12) United States Patent
Hughes et al.

(10) Patent No.: US 7,463,360 B2
(45) Date of Patent: *Dec. 9, 2008

(54) OPTICAL RESONATOR GYRO WITH INTEGRATED EXTERNAL CAVITY BEAM GENERATOR

(75) Inventors: Grenville Hughes, Wayzata, MN (US); Glen A. Sanders, Scottsdale, AZ (US); Lee K. Strandjord, Tonka Bay, MN (US)

(73) Assignee: Honeywell International Inc., Morristown, NJ (US)

( * ) Notice: Subject to any disclaimer, the term of this patent is extended or adjusted under 35 U.S.C. 154(b) by 273 days.

This patent is subject to a terminal disclaimer.

(21) Appl. No.: 11/406,939

(22) Filed: Apr. 18, 2006

(65) Prior Publication Data

US 2007/0242276 A1    Oct. 18, 2007

(51) Int. Cl.
*G01C 19/72* (2006.01)
(52) U.S. Cl. .................................................. 356/461
(58) Field of Classification Search ................. 356/461, 356/470
See application file for complete search history.

(56) References Cited

U.S. PATENT DOCUMENTS

| | | | |
|---|---|---|---|
| 4,135,822 A | 1/1979 | Ezekiel | |
| 4,234,357 A | 11/1980 | Scheppele | |
| 4,315,693 A | 2/1982 | Walker | |
| 4,673,293 A | 6/1987 | Sanders | |
| 4,702,600 A * | 10/1987 | Handrich et al. | 356/461 |
| 4,863,272 A | 9/1989 | Coccoli | |
| 4,886,345 A | 12/1989 | Popek | |
| 4,958,898 A | 9/1990 | Friedman et al. | |
| 5,018,857 A * | 5/1991 | Sanders et al. | 356/461 |

(Continued)

FOREIGN PATENT DOCUMENTS

EP    1391693 A1    2/2004

(Continued)

OTHER PUBLICATIONS

Glen A. Sanders et al., Optical Gyro with Free Space Resonator and Method for Sensing Inertial Rotation Rate, Nov. 17, 2005, 19 pages, U.S. Appl. No. 11/282,229, USA.

(Continued)

*Primary Examiner*—Samuel A Turner
(74) *Attorney, Agent, or Firm*—Black Lowe & Graham PLLC (57) ABSTRACT

Methods and apparatus are provided for determining the rotational rate of an optical gyro. An optical gyro comprises at least one substrate, a multi-frequency light source (MFLS) mounted on the substrate, and a resonator coupled to the MFLS. The MFLS is configured to produce a first light beam having a first frequency and a second light beam having a second frequency and phase locked with the first light beam. The resonator comprises an optical fiber coil having a hollow core. The resonator is configured to circulate a portion of each of the first and second light beams through the hollow core. The portion of the first light beam propagates in a first counter-propagating direction, and the portion of the second light beam propagates in a second counter-propagating direction. A measured difference between the first and second frequencies indicates a frequency shift proportional to the rotation rate of the optical gyro.

19 Claims, 4 Drawing Sheets

U.S. PATENT DOCUMENTS

| | | | |
|---|---|---|---|
| 5,029,978 A | 7/1991 | Curtis et al. | |
| 5,090,810 A | 2/1992 | Malvern | |
| 5,141,315 A * | 8/1992 | Malvern | 356/464 |
| 5,143,577 A | 9/1992 | Haas et al. | |
| 5,163,118 A | 11/1992 | Lorenzo et al. | |
| 5,194,917 A | 3/1993 | Regener | |
| 5,325,174 A | 6/1994 | Danko | |
| 5,383,048 A | 1/1995 | Seaver | |
| 5,408,566 A | 4/1995 | Eda et al. | |
| 5,429,981 A | 7/1995 | Gardner et al. | |
| 5,500,544 A | 3/1996 | Park et al. | |
| 5,696,662 A | 12/1997 | Bauhahn | |
| 5,793,060 A | 8/1998 | Morikawa | |
| 5,841,931 A | 11/1998 | Foresi et al. | |
| 5,861,651 A | 1/1999 | Brasen | |
| 5,908,305 A | 6/1999 | Crampton et al. | |
| 6,063,299 A | 5/2000 | Drake et al. | |
| 6,108,212 A | 8/2000 | Lach et al. | |
| 6,147,362 A | 11/2000 | Keyser | |
| 6,150,266 A | 11/2000 | Lin et al. | |
| 6,259,089 B1 * | 7/2001 | Vali et al. | 356/460 |
| 6,270,604 B1 | 8/2001 | McCallion et al. | |
| 6,311,003 B1 | 10/2001 | Dubey et al. | |
| 6,323,985 B1 | 11/2001 | Maloney | |
| 6,372,609 B1 | 4/2002 | Aga et al. | |
| 6,418,999 B1 | 7/2002 | Yanagita et al. | |
| 6,493,089 B2 | 12/2002 | Numai | |
| 6,493,502 B1 | 12/2002 | Deliwala | |
| 6,526,187 B1 | 2/2003 | Deliwala | |
| 6,546,538 B1 | 4/2003 | Rubdi et al. | |
| 6,566,155 B1 | 5/2003 | Numai | |
| 6,603,166 B2 | 8/2003 | Fechner et al. | |
| 6,603,889 B2 | 8/2003 | Deliwala | |
| 6,608,945 B2 | 8/2003 | Deliwala | |
| 6,611,636 B2 | 8/2003 | Deliwala | |
| 6,625,348 B2 | 9/2003 | Deliwala | |
| 6,627,954 B1 | 9/2003 | Seefeldt | |
| 6,646,747 B2 | 11/2003 | Deliwala | |
| 6,654,511 B2 | 11/2003 | Deliwala | |
| 6,656,747 B2 | 12/2003 | Sameshima | |
| 6,658,173 B2 | 12/2003 | Delwala | |
| 6,671,443 B2 | 12/2003 | Deliwala | |
| 6,690,844 B2 | 2/2004 | Deliwala | |
| 6,690,863 B2 | 2/2004 | Deliwala | |
| 6,693,225 B2 | 2/2004 | Boyer et al. | |
| 6,738,546 B2 | 5/2004 | Deliwala | |
| 6,748,125 B2 | 6/2004 | Deliwala | |
| 6,760,498 B2 | 7/2004 | Delwala | |
| 6,816,636 B2 | 11/2004 | Cole et al. | |
| 6,819,814 B2 | 11/2004 | Forrest et al. | |
| 6,823,112 B2 | 11/2004 | Deliwala | |
| 6,826,320 B2 | 11/2004 | Deliwala | |
| 6,842,546 B2 | 1/2005 | Deliwala | |
| 6,845,198 B2 | 1/2005 | Montgomery et al. | |
| 6,850,683 B2 | 2/2005 | Lee et al. | |
| 6,866,214 B2 | 3/2005 | Rodels et al. | |
| 6,869,881 B2 | 3/2005 | Deliwala | |
| 6,879,751 B2 | 4/2005 | Deliwala | |
| 6,888,219 B2 | 5/2005 | Keyser | |
| 6,890,450 B2 | 5/2005 | Naydenkov et al. | |
| 6,891,685 B2 | 5/2005 | Deliwala | |
| 6,891,985 B2 | 5/2005 | Delwala | |
| 6,895,136 B2 | 5/2005 | Deliwala | |
| 6,897,498 B2 | 5/2005 | Gothoskar et al. | |
| 6,898,352 B2 | 5/2005 | Deliwala | |
| 6,912,330 B2 | 6/2005 | Deliwala | |
| 6,917,727 B2 | 7/2005 | Gunn, III et al. | |
| 6,917,730 B2 | 7/2005 | Ghiron et al. | |
| 6,919,238 B2 | 7/2005 | Bohr | |
| 6,934,444 B2 | 8/2005 | Ghiron et al. | |
| 6,944,369 B2 | 9/2005 | Deliwala | |
| 6,947,615 B2 | 9/2005 | Deliwala | |
| 6,963,118 B2 | 11/2005 | Deliwala et al. | |
| 6,968,110 B2 | 11/2005 | Patel et al. | |
| 6,980,720 B2 | 12/2005 | Gothoskar et al. | |
| 6,987,910 B2 | 1/2006 | Shappir et al. | |
| 6,993,225 B2 | 1/2006 | Patel et al. | |
| 6,993,243 B2 | 1/2006 | Delwala | |
| 7,000,207 B2 | 2/2006 | Gothoskar et al. | |
| 7,003,196 B2 | 2/2006 | Ghiron et al. | |
| 7,013,067 B2 | 3/2006 | Ghiron et al. | |
| 7,020,364 B2 | 3/2006 | Ghiron et al. | |
| 7,079,742 B1 | 7/2006 | Gunn, III et al. | |
| 7,118,682 B2 | 10/2006 | Patel et al. | |
| 7,149,388 B2 | 12/2006 | Keyser et al. | |
| 7,177,489 B2 | 2/2007 | Keyser et al. | |
| 7,217,584 B2 | 5/2007 | Yue et al. | |
| 2002/0003650 A1 | 1/2002 | Usami et al. | |
| 2002/0164143 A1 | 11/2002 | Csutak et al. | |
| 2002/0172464 A1 | 11/2002 | Delwala | |
| 2002/0185675 A1 | 12/2002 | Furukawa | |
| 2003/0026571 A1 | 2/2003 | Bazylenko | |
| 2003/0054639 A1 | 3/2003 | Deliwala | |
| 2003/0059190 A1 | 3/2003 | Gunn, III et al. | |
| 2003/0063364 A1 | 4/2003 | Kambe | |
| 2003/0081924 A1 | 5/2003 | Yegnanarayanan | |
| 2003/0098289 A1 | 5/2003 | Zheng et al. | |
| 2003/0102079 A1 | 6/2003 | Kalvesten et al. | |
| 2003/0151793 A1 | 8/2003 | Sugiyama et al. | |
| 2003/0184950 A1 | 10/2003 | Nakamura | |
| 2003/0207215 A1 | 11/2003 | Xu et al. | |
| 2003/0223671 A1 | 12/2003 | Morse | |
| 2004/0002197 A1 | 1/2004 | Fathimulla et al. | |
| 2004/0021157 A1 | 2/2004 | Yue et al. | |
| 2004/0061863 A1 * | 4/2004 | Digonnet | 356/460 |
| 2004/0126051 A1 | 7/2004 | Bruel | |
| 2004/0151463 A1 | 8/2004 | Talin et al. | |
| 2004/0223768 A1 | 11/2004 | Shastri et al. | |
| 2004/0258347 A1 | 12/2004 | Gothoskar et al. | |
| 2005/0094939 A1 | 5/2005 | Ghiron et al. | |
| 2005/0110108 A1 | 5/2005 | Patel et al. | |
| 2005/0123232 A1 | 6/2005 | Piede et al. | |
| 2005/0123259 A1 | 6/2005 | Gunn, III et al. | |
| 2005/0135727 A1 | 6/2005 | Piede et al. | |
| 2005/0152658 A1 | 7/2005 | Keyser | |
| 2005/0179986 A1 | 8/2005 | Gothoskar et al. | |
| 2005/0189591 A1 | 9/2005 | Gotheskar et al. | |
| 2005/0194990 A1 | 9/2005 | Gothoskar et al. | |
| 2005/0213873 A1 | 9/2005 | Peide et al. | |
| 2005/0214989 A1 | 9/2005 | Keyser | |
| 2005/0236619 A1 | 10/2005 | Patel et al. | |
| 2005/0289490 A1 | 12/2005 | Shastri et al. | |
| 2006/0018597 A1 | 1/2006 | Piede et al. | |
| 2006/0038144 A1 | 2/2006 | Maddison | |
| 2006/0063679 A1 | 3/2006 | Yue et al. | |
| 2006/0083144 A1 | 4/2006 | Piede et al. | |

FOREIGN PATENT DOCUMENTS

| | | | |
|---|---|---|---|
| EP | 1783456 A1 | | 5/2007 |
| GB | 2355312 A1 | | 4/2001 |
| JP | 4154178 | | 5/1992 |
| JP | 405272981 A | * | 10/1993 |
| JP | 6029018 | | 2/1994 |
| WO | 0206909 A2 | | 9/2002 |
| WO | 03023468 A2 | | 3/2003 |
| WO | 03077015 A1 | | 9/2003 |
| WO | 2004088396 A2 | | 10/2004 |

OTHER PUBLICATIONS

Glen A. Sanders et al., System and Method for Stabilizing Light Sources In Resonator Gyro, Dec. 9, 2005, 37 pages, U.S. Appl. No. 11/298,439, USA.

Glen A. Sanders et al., Hollow Core Fiber Optical Gyro, Jan. 6, 2006, 17 pages, U.S. Appl. No. 11/342,158, USA.

Ahmed et al., "Nitrided Thermal SiO2 for Thin Buried Gate Insulator in Dual Gate SOI-MOSFET", University/Government/Industry Microelectronics Symposium, 1999. Proceedings of the Thirteenth Biennial Minneapolis, MN Jun. 20-23, 1999, Piscatatway, NJ, IEEE, Jun. 20, 1999, pp. 43-46.

Ahmed et al., "Nitrided Thermal SiO2 for Use as Top and Bottom Gate Insulators in Self-Aligned Double Gate Silicon-on-Insulator Metal-Oxide-Semiconductor Field Effect Transistor", Journal of Vacuum Science & Technology B (Microelectronics and Nanometer Structures) AIP for American Vacuum Soc., vol. 19, No. 3, May 2001, pp. 800-806.

Celler et al., "Smart Cut TM. A guide to the Technology, the Process, the Products", SOITEC, Jul. 2003, 1-8.

Celler et al., "Strained Silicon on Insulator. A quick Guide to the Technology, the Processes, the Products", SOITEC, Jul. 2003, 1-4.

Hilleringmann et al., "Optoelectronic System Integration on Silicon: Waveguides, Photodetectors, and VLSI CMOS Circuits on One Chip", IEEE Transactions on Electron Devices, 42 (1995) Mai, No. 5, New York, NY, US pp. 841-846.

Joshi et al., "Oxynitride Gate Dielectrics for p+ Polysilicon Gate MOS Devices", IEEE Electron Devices Letters, vol. 14, No. 12, Dec. 1993, pp. 560-562, XP000418671.

Ling Liao et al., "Optical Transmission Losses in Plycrystalline Silicon Strip Waveguides: Effects on Waveguide Dimensions, Thermal Treatment, Hydrogen Passivation, and Wavelength", Journal of Electronic Materials, vol. 29, No. 12, 2002, 1380.

Liu et al., "A High-Speed Silicon Optical Modulator Based on a Metal-Oxide-Semiconductor Capacity," Nature, vol. 427, Feb. 12, 2004. www.nature.com.

Nishihara, Hiroshi, et al., "Optical Integrated Circuits", R.R. Donelley & Sons Company, 1989, pp. 224-235.

PNG et al., "Development of Small Silicon Modulators in Silicon-on-Insulator (SOI)", Proceedings of the SPIE, SPIE, Bellingham, VA, vol. 4997, 2003, pp. 190-197.

Reed, G.T., et al., "Silicon on Insulator Optical Waveguides Formed by Direct Wafer Bonding", Materials Science and Engineering B, Elsevier Sequoia, Lausanne, Ch. vol. B15, No. 2, Nov. 1, 1992, pp. 156-159.

Samara-Rubio D., et al., "A Gigahertz Silicon-on-Insulator Mach-Zehnder Modulator", Optical Fiber Communication Conference, 2004. OFC 2004 Los Angeles, CA USA, Feb. 23-25, 2004, IEEE, Feb. 26, 2004, pp. 701-703, XP) 10745963.

Singh Jagar et al., "Design Methodology of the High-Performance Large-Grain Polysilicon MOSFET", IEEE Transactions on Electron Devices, vol. 49, No. 5, May 2002, 795-801.

Waldron et al., "Optical Modulator in Silicon-on-Insulator with a Low Thermal Signature", J. Vac. Sci. Thechnol. A 22(3) May/Jun. 2004, 2004 American Vacuum Society.

Liu et al., "Fast Silicon Optical Modulator", Proc. Of the SPIE—Optoelectronic Integration on Silicon—Jul. 2004, vol. 5357, pp. 35-44.

Patel, Vipulkumarkatilal, et al., Conventional CMOS Compatible Fabrication Methods for Silicon based Passve Optical and Active Electro-Optic Devices, Apr. 21, 2003, U.S. Appl. No. 60/646,491.

Patel, Vipulkumarkatilal, et al., Low Loss SOI/CMOS Compatible Silicon Waveguide, Mar. 28, 2003, U.S. Appl. No. 60/458,501.

Montgomery, Robert, et al., Silicon Electro-Optic Modulator Device, Mar. 25, 2006, U.S. Appl. No. 60/457,242.

* cited by examiner

OPTICAL RESONATOR GYRO WITH INTEGRATED EXTERNAL CAVITY BEAM GENERATOR

The present invention generally relates to gyro systems, and more particularly relates to rotational sensors for use in navigation systems and attitude control.

BACKGROUND OF THE INVENTION

Gyros have been used to measure rotation rates or changes in angular velocity about an axis of rotation. A basic conventional fiber optic gyro (FOG) includes a light source, a beam generating device, and a coil of optical fiber coupled to the beam generating device that encircles an area. The beam generating device transmits light beams into the coil that propagate in a clockwise (CW) direction and a counter-clockwise (CCW) direction along the core of the optical fiber. Many FOGs utilize glass-based optical fibers that conduct light along a solid glass core of the fiber. The two counter-propagating (e.g., CW and CCW) beams experience different pathlengths while propagating around a rotating closed optical path, and the difference in the two pathlengths is proportional to the rotational rate.

In a resonator fiber optic gyro (RFOG), the counter-propagating light beams are desirably monochromatic (e.g., in a single frequency) and circulate through multiple turns of the fiber optic coil and for multiple passes through the coil using a device that redirects light that has passed through the coil back into the coil again (i.e., circulates the light) such as a fiber coupler. The beam generating device modulates and/or shifts the frequencies of each of the counter-propagating light beams so that the resonance frequencies of the resonant coil may be observed. The resonance frequencies for each of the CW and CCW paths through the coil are based on a constructive interference condition such that all light-waves having traversed the coil a different number of times interfere constructively at any point in the coil. As a result of this constructive interference, an optical wave having a wavelength λ is referred to as "on resonance" when the round trip resonator optical pathlength is equal to an integral number of wavelengths. A rotation of the coil produces a different optical pathlength for clockwise and counterclockwise propagation, thus producing a shift between the respective resonance frequencies of the resonator, and the frequency difference, such as may be measured by tuning the difference in the CW beam and CCW beam frequencies to match the resonance frequency shift of the closed optical path due to rotation, indicates the rotation rate.

Frequency shifters and phase modulators have been used with the beam generating device (e.g., a laser light source) to modulate and shift the frequencies of each of the counter-propagating light beams so that the resonance frequencies of the resonant coil may be observed. The frequency shifters and phase modulators may be difficult to economically implement particularly for smaller scale applications or implementations of the resonator gyro. Alternatively, tunable lasers may be used for introducing the counter-propagating light beams and for resonance detection without the use of frequency shifters and phase modulators. However, when using two or more tunable lasers for resonance detection, the relative frequency noise between such lasers is typically the greatest contributor to angle random walk (ARW) which decreases the rotation rate accuracy of detected by the resonator gyro.

In the RFOG, the glass material of the optical fiber may give rise to effects that shift the resonance frequencies of the CW and CCW paths and thus produce a false indication of rotation or inaccurate measurement of rotation rate. Anomalies stemming from the glass medium that decrease the accuracy of the measurement of the rotational rate may be generated from a non-linear Kerr effect, stimulated Brillouin scattering, polarization errors, and Rayleigh backscatter errors. These error mechanisms are also sensitive to the environment which, for example, gives rise to unwanted temperature sensitivity. A reflective mirror may be used to circulate the counter-propagating light beams in the coil multiple times but this typically reduces the signal-to-noise ratio from losses generated at the transition from the mirror to the coil.

The non-linear Kerr effect occurs when high monochromatic light power inside the RFOG alters the index of refraction of the glass in the optical fiber. A mismatch of intensities of the CW and CCW beams may induce a bias on the observed frequency shifts on the order of several degrees/hour. Stimulated Brillioun scattering (SBS) occurs when a high intensity associated with a high finesse in the fiber resonator causes lasing or stimulated emission in the glass fiber, and this generally promotes large instabilities in the measurement of the resonance frequencies. Polarization-induced errors may result from fiber couplers that incidentally couple light into a second polarization mode, either from one optical fiber to an adjacent optical fiber or within the same fiber. The second polarization mode may resonate producing an asymmetry in the resonance lineshape of the polarization mode used to measure a rotation. Even though the frequency of the second polarization mode is the same for the CW and CCW beams, the amplitude may be different, thus causing different observations, beyond the affect of rotation, of the resonance frequencies of the CW and CCW beams. Polarization-induced errors may severely limit the accuracy of the RFOG because determination of the resonance centers for each of the resonance frequencies of the CW and CCW beams directly affects the rotational rate measurement. Rayleigh backscatter errors may be a source of drift rate in a resonator gyro. Backscattered light from the glass within the fiber or from imperfections with the fiber can interfere with the circulating light beams and cause significant drift rate errors.

In addition to encountering error mechanisms that may affect accuracy, the conventional RFOG may be cost prohibitive for high volume production, particularly for a smaller scale RFOG. The conventional RFOG is an assembly of multiple discrete components (e.g., light source, beam generator, coil, etc.) that has an associated cost for each component and for assembling such components. For smaller scale applications, the cost associated with assembling the RFOG generally increases with the increased cost for miniaturizing each discrete component and aligning the miniaturized discrete optical components.

Accordingly, it is desirable to provide a resonator gyro for small-sized navigation grade applications with affordable cost. In addition, it is desirable to provide a resonator gyro that minimizes inaccuracies due to non-linear Kerr effect, stimulated Brillouin scattering, polarization errors, and bend losses associated with fiber resonator gyros based on conventional optical fiber. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Apparatus are provided for determining the rotational rate of an optical gyro. In an exemplary embodiment, an optical gyro comprises at least one substrate, a multi-frequency light source (MFLS) mounted on the substrate, and a resonator coupled to the MFLS. The MLFS is configured to produce a first light beam having a first frequency and a second light beam having a second frequency. The first light beam is phase locked and frequency locked with the second light beam although a tunable frequency difference is imparted between the first and second light beams. The resonator has first and second counter-propagating directions and comprises an optical fiber coil having a hollow core. The resonator is configured to circulate a portion of each of the first and second light beams through the hollow core. The portion of the first light beam propagates in the first counter-propagating direction, and the portion of the second light beam propagates in the second counter-propagating direction. A difference between the first and second frequencies indicates a frequency shift proportional to a rotation rate of the optical gyro.

In another exemplary embodiment, an optical gyro comprises at least one substrate, first and second light sources mounted on the substrate, a resonator coupled to the first and second light sources, and a sensor configured to detect a first resonance frequency of a first counter-propagating direction of the resonator and further configured to detect a second resonance frequency of a second counter-propagating direction of the resonator. The first light source is configured to produce a first input beam having a first frequency, and the second light source is configured to produce a second input beam having a second frequency. The resonator comprises an optical fiber coil having a hollow core and first and second ends coupled to the substrate. The optical fiber coil is configured to direct a portion of the first input beam in the first counter-propagating direction and is further configured to direct a portion of the second input beam in the second counter-propagating direction. The measurement of the first resonance frequency is based on tuning of the first frequency, and the measurement of the second resonance frequency based on tuning of the second frequency. A difference between the first resonance frequency and the second resonance frequency is proportional to a rotational rate of the optical gyro.

In another exemplary embodiment, an optical gyro comprises at least one substrate, first, second, and third lasers mounted on the substrate, an optics subsystem mounted on the substrate and configured to phase lock the second and third lasers with the first laser, and a resonator. The first laser is configured to produce a first light beam having a first frequency, the second laser is configured to produce a second light beam having a second frequency, and the third laser is configured to produce a third light beam having a third frequency. The resonator has first and second counter-propagating directions. The first counter-propagating direction has a first resonance frequency, and the second counter-propagating direction has a second resonance frequency and a third resonance frequency. The resonator is configured to circulate a portion of each of the first, second, and third light beams. The resonator comprises an optical fiber coil having a hollow core. The portion of the first light beam circulates in the first counter-propagating direction through the hollow core, and the portions of the second and third light beams circulate in the second counter-propagating direction through the hollow core. The first frequency is tuned to the first resonance frequency, the second frequency is tuned to the second resonance frequency, and the third frequency is tuned to the third resonance frequency.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
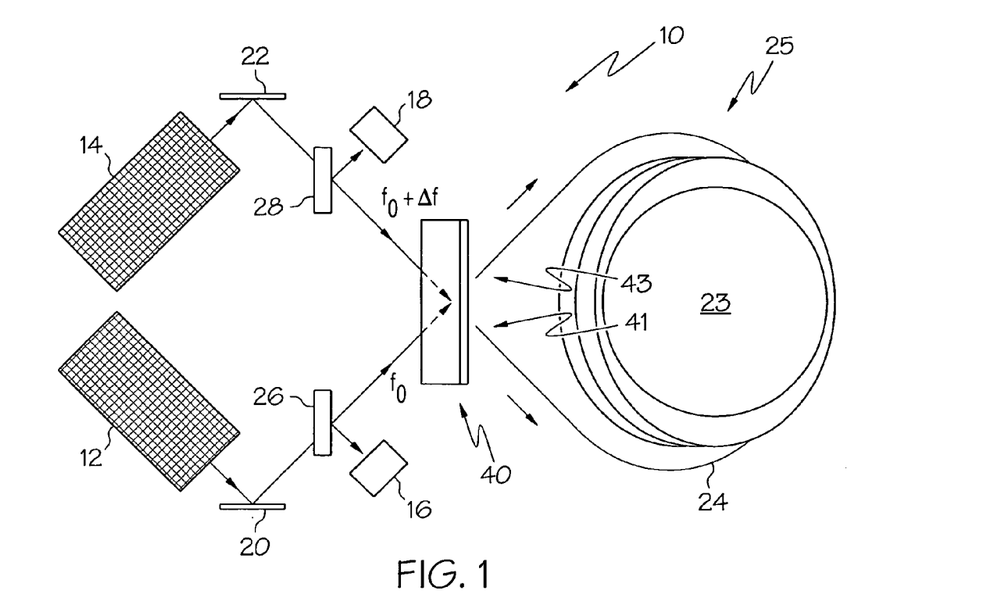
FIG. 1 is a block diagram of a resonator gyro in accordance with an exemplary embodiment of the present invention.

Referring now to the drawings, FIG. 1 is a block diagram of a resonator gyro 10 in accordance with an exemplary embodiment of the present invention. The resonator gyro 10 comprises first and second tunable light sources 12, 14 (e.g., tunable lasers) that synthesize light beams, respectively, a resonator 25 having a recirculator 40 that introduces the light beams into the resonator 25, and first and second photodetectors 16, 18 that receive first and second return beams from the resonator 25. The light beam produced by the first tunable laser 12 is tuned to a frequency $f_0$, and the light beam produced by the second tunable laser 14 is tuned to a frequency $f_0 + \Delta f$. The relative frequency drift and jitter between the two laser frequencies is preferably substantially minimized to a level that minimizes or does not affect the accuracy and stability of the frequency shift, and thus rotational rate, measurement. This can be accomplished by a laser frequency stabilization technique using electronic servos to lock their beat frequencies to a tunable stable offset that is proportional to rotational rate. Each of the tunable lasers 12, 14 may sinusoidally frequency modulate the corresponding generated light beam. Additionally, the resonator gyro 10 may include additional mirrors 20, 22 and beam splitters 26, 28 for directing the propagation of light beams from the tunable lasers 12, 14 to the resonator 25 and for directing light from the resonator 25 to the photodetectors 16, 18.

The resonator 25 comprises the recirculator 40, a hollow core optical fiber coil 24 having first and second ends 41, 43 coupled to the recirculator 40, and a piezoelectric transducer (PZT) hub 23. The optical fiber coil 24 has multiple turns that encircle an area. In one embodiment, the optical fiber coil 24 encircles the PZT hub 23, and thus the diameter of the PZT hub 23, and the PZT hub 23 sinusoidally stretches the optical fiber coil 24 at a predetermined modulation frequency. The recirculator 40 introduces the light beams (e.g., CW and CCW input light beams) into the hollow core and circulates a portion of the light beams through the optical fiber coil 24. The recirculator 40 reintroduces light emerging from one end of the optical fiber coil 24 into the other end of the fiber coil 24, thus causing light to propagate through the fiber coil 24 many times. In an alternative embodiment, the PZT hub 23 is omitted from the resonator 25 and the recirculator 40 introduces modulated input light beams (e.g., modulated by the tunable lasers 12, 14) into the hollow core of the optical fiber coil 24 and circulates a portion of the modulated light beams through the optical fiber coil 24.

After receiving the modulated light beams from the tunable lasers 12, 14, the resonator 25 directs a portion of the two modulated light beams in counter-propagating directions (e.g., CW and CCW directions). By application of the Sagnac Effect, the optical gyro 10 senses a rotation rate about an axis of the optical gyro 10. The photodetectors 18, 16 detect the resonance centers of the resonance lineshapes for the CW and CCW circulating light beams and determine the resonance frequencies associated with each of the counter-propagating directions of the resonator 25 based on the frequency shift between the detected resonance centers. The frequency shift is used to determine the rotation rate of the optical gyro 10. For example, the first light beam (e.g., a CW beam) has an unshifted laser frequency $f_0$ and is introduced into the resonator 25. For rotation sensing, the frequency $f_0$ of the CW beam is tuned (e.g., by tuning the frequency of the laser 12) to the resonance frequency of the resonator 25 in the CW direction. The second light beam (e.g., a CCW beam) frequency is tuned via the frequency $\Delta f$ to align the CCW beam frequency with the resonance center frequency of the resonator 25 in the CCW direction.

To measure the resonance center-frequencies in either the CW direction or CCW direction, a standard synchronous detection technique is used. Each input light beam is sinusoidally phase-modulated, and therefore frequency modulated at frequencies $f_m$ and $f_n$, respectively, to dither each input beam frequency across a resonance lineshape as measured by the photodetectors 18, 16. For example, additional circuitry coupled to the photodetectors 18, 16 may demodulate the output of the photodetectors 18, 16 at the frequencies $f_m$ and $f_n$, respectively, to measure resonance centers indicated by the light outputs of the CW and CCW beams. At the line centers of the resonance lineshapes, or the resonance centers, the photodetector 16 detects a minimum output at the fundamental frequencies $f_m$ and $f_n$, respectively. When the input beam frequency (e.g., $f_0+\Delta f$ or $f_0$) is off-resonance, an error signal at frequencies $f_m$ and $f_n$, respectively, is sensed by the photodetector and used to tune the respective beam frequency to the respective resonance frequency of the resonator 25. The frequency of the CW beam is tuned by changing the frequency, $f_0$, of the laser 12 and the frequency of the CCW beam is adjusted via a feedback loop that changes the frequency shift, $\Delta f$, of the second laser 14 so that $f_0+\Delta f$ matches the CCW resonance frequency of the resonator 25.

When $f_0+\Delta f$ is tuned away from the resonance frequency of the resonator 25 in the CCW direction, the energy from the CCW beam does not produce a maximum intensity in the resonator 25 and a minimum in the resonance lineshape is not seen at the photodetector 16. When $f_0+\Delta f$ is tuned at the resonance frequency of the resonator 25 in the CCW direction, the CCW beam has a minimum output, i.e., center of a resonance dip, thereby indicating the resonance center. Similarly for the CW light beam, the energy of the CW beam enters the fiber optical coil 24 when the CW beam is tuned to the resonance frequency of the resonator 25 in the CW direction.

In the absence of rotation, the round-trip path-lengths of the CW and CCW beams inside the resonator 25 in the CW and CCW direction, respectively, are substantially equal. Thus, $\Delta f$ is tuned to zero by the second laser 14. In the presence of rotation, the round-trip path-lengths differ between the CW and the CCW directions producing a resonance frequency difference between the two directions that is proportional to the rotation rate. By tuning the frequency $f_0$ to track the CW resonance and the frequency $\Delta f$ to track the CCW resonance center, the rotation rate is determined.

The CW and CCW beams propagate through a hollow core, band-gap, optical fiber having an extremely low bend loss, and the coil 24 preferably has a large number of turns about a substantially small area to achieve a compact gyro which is one advantage of this invention. For example, the coil 24 may have from about 20-40 turns of the optical fiber about a one centimeter diameter. The hollow core optical fiber is typically glass-based with a plastic outer jacket and a hollow inner core. In the hollow core optical fiber, light injected from the recirculator 40 traverses mostly through free space (e.g., air or a vacuum) along the core, and only about a few percent or less of the optical energy of light is contained in the glass walls of the fiber surrounding the hollow core. Because a large majority of the light energy traverses through free space along the hollow core of optical fiber, the transition between the recirculator 40 and the hollow core optical fiber has a near-perfect index matching, and a high reflectivity laser mirror with low loss and attractive polarization properties may be used for the recirculator 40. The hollow core fiber is suited to significantly attenuate, or eliminate altogether, the rotation measurement errors commonly associated with the properties of the glass medium in the core of conventional fibers.

The most preferred hollow fiber properties are low loss, tight bend radii, high reliability, minimal number of spatial modes (e.g., ideally one spatial mode), and a maximum degree of polarization preservation. In the case of spatial modes, it is preferable to minimize losses and secondary undesirable resonances that result from the excitation of modes (e.g., higher order modes) that have different spatial distributions of light in the fiber. The excitation of these secondary resonances can cause apparent distortions of the lineshapes of the main CW and CCW resonances used for measuring rotation and, thus, rotation rate errors. It is also preferable to minimize other types of spatial mode distributions in the fiber, such as surface mode, in which light can be distributed on the surface of the walls or within the walls surrounding the hollow core of the fiber. In this case, the excitation of surface modes may cause light loss, spurious errors, excess noise, or drift.

Figure 2:
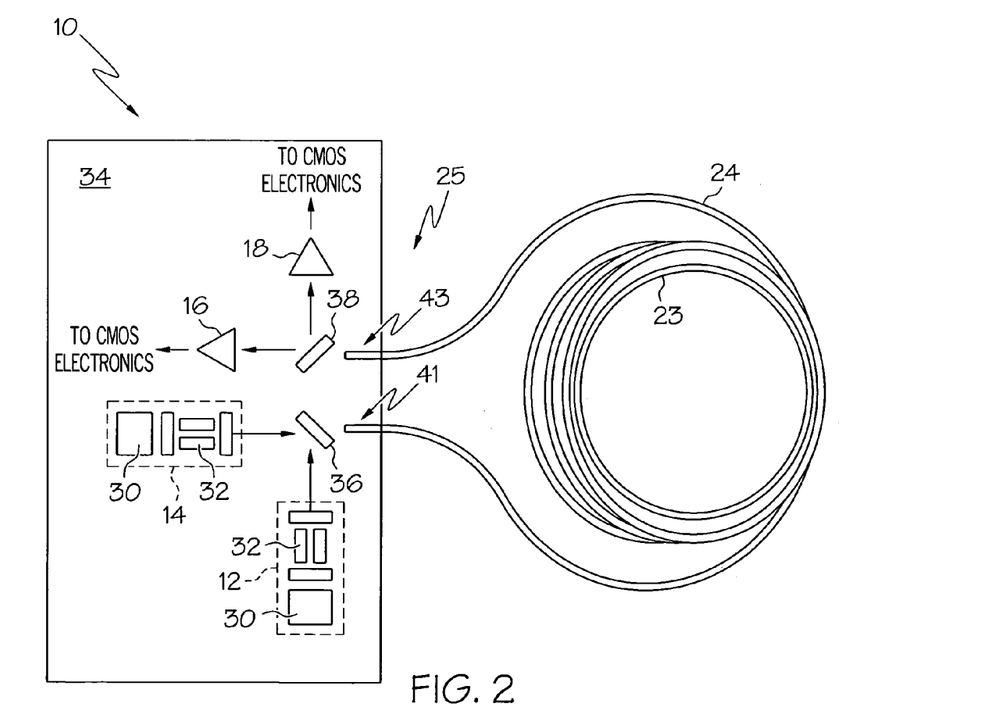
FIG. 2 is a block diagram of a resonator gyro in accordance with another exemplary embodiment of the present invention.

FIG. 2 is a block diagram of the resonator gyro 10 shown in FIG. 1 on a silicon optical bench 34 in accordance with another exemplary embodiment of the present invention. The lasers 12, 14 and photodetectors 16, 18 are mounted on the silicon optical bench 34. Each of the lasers 12, 14 is an external cavity semiconductor laser having a laser diode 32 (e.g., a Fabry-Perot laser diode), an external reflector or reflectors, and an electronic drive 30 for modulating the frequency of the light beam produced by the laser diode 32. The lasers 12, 14 may additionally include a frequency-selective element and focusing lenses or elements to produce a narrow linewidth light beam having a single pre-determined frequency in a spatially desirable output. The photodetectors 16, 18 sample portions of the CW and CCW circulating light beams and are each coupled to additional circuits (e.g., CMOS based resonance tracking circuits) for analyzing the resonance lineshapes associated with CW and CCW circulating light beams.

In this exemplary embodiment, first and second mirror reflectors 36, 38 introduce portions of the CW and CCW light beams from the lasers 12, 14 into the hollow core of the optical fiber 24 via the ends 43, 41 of the optical fiber 24. The mirror reflectors 36, 38 are also mounted on the silicon optical bench 34, and the ends 41, 43 of the optical fiber 24 are coupled to the silicon optical bench 34 (e.g., via V-shaped groves formed on the silicon optical bench 34). The mirror reflectors 36, 38 also circulate the portions of the CW and CCW light beams through the optical fiber coil 24. For example, the first mirror reflector 36 directs a CW circulating light beam from the first end 41 of the optical fiber coil 24 to the second mirror reflector 38, and the second mirror reflector directs the CW circulating light beam from the first mirror reflector 36 to the second end 43 of the optical fiber coil 24. Additionally, the second mirror reflector 38 directs the CCW circulating light beam from the second end 43 of the optical fiber coil 24 to the first mirror reflector 36, and the first mirror reflector directs the CCW circulating light beam from the second mirror reflector 38 to the first end 41 of the optical fiber coil 24.

Although the resonator gyro 10 is described in the context of a silicon optical bench 34, a variety of substrates may be used including, but not necessarily limited to silicon, silicon-on-insulator, InGaAsP, and the like. Using miniature optical bench techniques, a variety of precision optical structures may be etched or formed on the surface of the silicon optical bench 34, and external optical components may be precisely mounted on the surface of the silicon optical bench 34 or formed on the silicon optical bench 34. Additional material layers may be formed above a base layer of the silicon optical bench 34. For simplicity of discussion, the term substrate includes additional material layers that may be formed above the base layer of the substrate.

Figure 3:
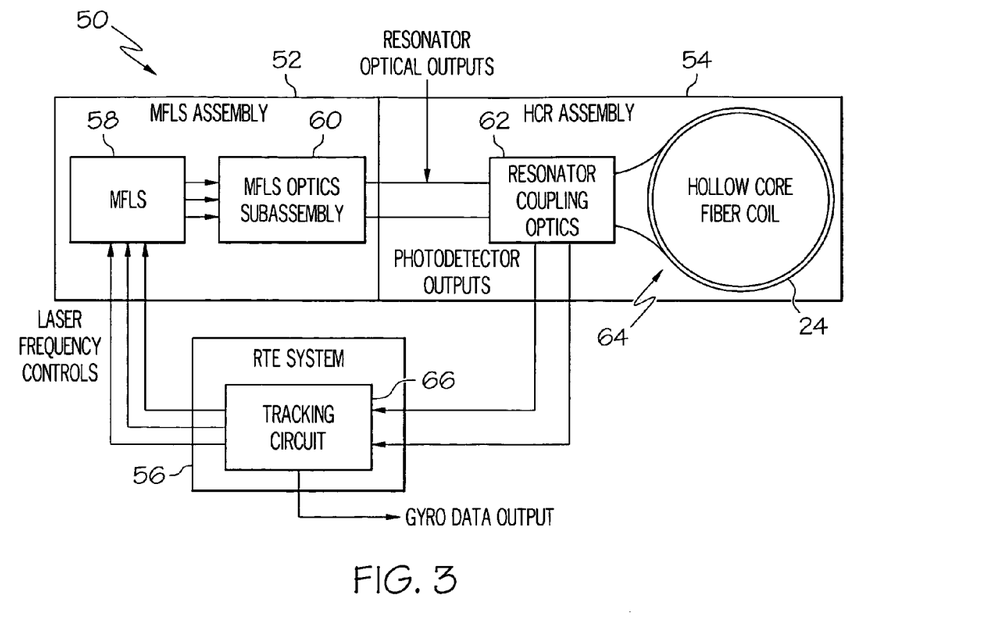
FIG. 3 is a partial schematic diagram of a resonator gyro in accordance with another exemplary embodiment of the present invention.

FIG. 3 is a partial schematic diagram of a resonator gyro 50 in accordance with another exemplary embodiment of the present invention. The resonator gyro 50 comprises a multi-frequency laser source (MFLS) assembly 52, a hollow core resonator (HCR) assembly 54 coupled to an output of the MFLS assembly 52, and a resonance tracking electronics (RTE) system 56 having an input coupled to an output of the HCR assembly 54, a first output coupled to an input of the MFLS assembly 52, and a second output for providing gyro data of the resonator gyro 50. Using a feedback loop from the HCR assembly 54 to the MFLS assembly 52 via the RTE system 56, one or more slave lasers in the MFLS assembly 52 and a master laser in the MFLS assembly 52 are tunable to produce modulated light beams that are locked onto resonance frequencies corresponding to respective propagation directions in the resonator. For example, the master laser produces a CW beam that is tuned to a resonance frequency of the CW direction of the resonator, a first slave laser produces a CCW beam that is tuned to a resonance frequency of the CCW direction of the resonator that is a free spectral range (FSR) above the resonance frequency of the CW direction, and a second slave laser produces another CCW beam that is tuned to a resonance frequency of the CCW direction of the resonator that is an FSR below the resonance frequency of the CW direction. By doing this, backscatter errors that may be produced by light coupling in the resonator are frequency shifted to a very high frequency and filtered out.

The MFLS assembly 52 comprises an MFLS 58 and an MFLS optics subassembly 60 coupled to an output of the MFLS 58 that routes the modulated light beams to the HCR assembly 54 and provides an optical feedback of the modulated light beams to the MFLS. The MFLS 58 includes, but is not necessarily limited to, the master laser and one or more slave lasers for generating the modulated light beams in response to control signals from the RTE system 56. The HCR assembly 54 comprises resonator coupling optics 62 (e.g., the recirculator 40 and photodetectors 16, 18 shown in FIG. 1) having an input coupled to the MFLS optics subassembly 60 and a resonator 64 coupled to a first output of the resonator coupling optics 62. The resonator 64 includes the recirculator 40 and the hollow core fiber coil 24 shown in FIG. 1 and circulates a portion of the modulated light beams in counter-propagating directions. The recirculator 40 may be a mirror or a fiber coupler that recirculates light within the coil 24. The resonator coupling optics 62 provides optical data (e.g., intensity measurements of the CW and CCW circulating beams) to the RTE system 56 via a second output. The RTE system 56 comprises a resonance tracking circuit 66 having an input coupled to the second output of the resonator coupling optics 62 and has an output coupled to an input of the MFLS 58, and the RTE system 56 may comprise additional components such as analog-to-digital (A/D) converters and digital-to-analog converters (DACs) for processing signals received from the resonator coupling optics 62 and transmitted to the MFLS 58. The RTE system 56 produces laser frequency control signals for the master and slave lasers and applies an offset, dependent on the rotation rate and magnitude of the free spectral range of the resonator 64, to the light beam frequencies generated by at least one of the slave lasers. The offset is preferably based on an FSR between one resonance center and another resonance center, as detected by the photodetectors 18, 16, of a corresponding light beam.

Figure 4:
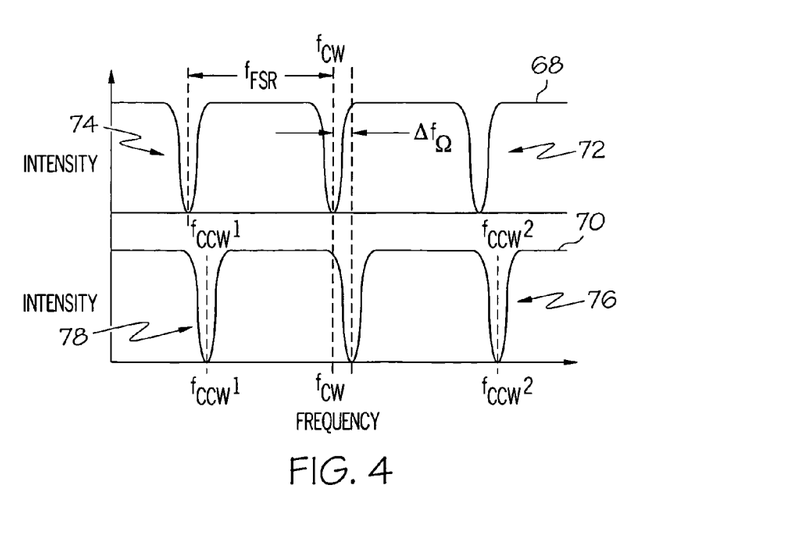
FIG. 4 is a clockwise intensity waveform and a counter-clockwise intensity waveform useful in understanding the resonance tracking system.

FIG. 4 is a clockwise intensity waveform 68 and a counter-clockwise intensity waveform 70 useful in understanding the resonator gyro 50. Referring to FIGS. 3 and 4, in an exemplary embodiment, when the CW beam is scanned through the resonance frequencies of the CW direction of the resonator 64, the CW intensity waveform 68 is observed having periodic resonance dips 72, 74. Similarly, when the CCW beam is scanned through the resonance frequencies of the CCW direction of the resonator 64, the CCW intensity waveform 70 is observed having periodic resonance dips 76, 78. The centers of these resonance dips 72, 74, 76, 78 indicate resonance frequencies.

By tuning the master laser to a CW resonance frequency $f_{cw}$, tuning the first slave laser to a first CCW resonance frequency, $f_{ccw,1}$, that is one FSR minus a frequency shift due to rotation below the CW resonance frequency $f_{cw}$, and tuning the second slave laser to a second CCW resonance frequency, $f_{ccw,2}$, that is one FSR plus a frequency shift due to rotation above the CW resonance frequency $f_{cw}$, a first beat frequency $\Delta f_1$ is produced between the master laser and the first slave laser and a second beat frequency $\Delta f_2$ is produced between the master laser and the second slave laser. These beat frequencies include both the frequency shift ($\Delta f_\Omega$) due to a rotation of the resonator gyro 50 and the FSR such that $$\Delta f_1 = f_{cw} - f_{ccw,1} = f_{FSR} - \Delta f_\Omega,$$

$$\Delta f_2 = f_{cw} - f_{ccw,2} = f_{FSR} + \Delta f_\Omega.$$

By subtracting the two beat frequencies, $$\Delta f_2 - \Delta f_1 = 2\Delta f_\Omega,$$

a rotation measurement is obtained without the need for precisely knowing the FSR and any associated drift rate errors.

Figure 5:
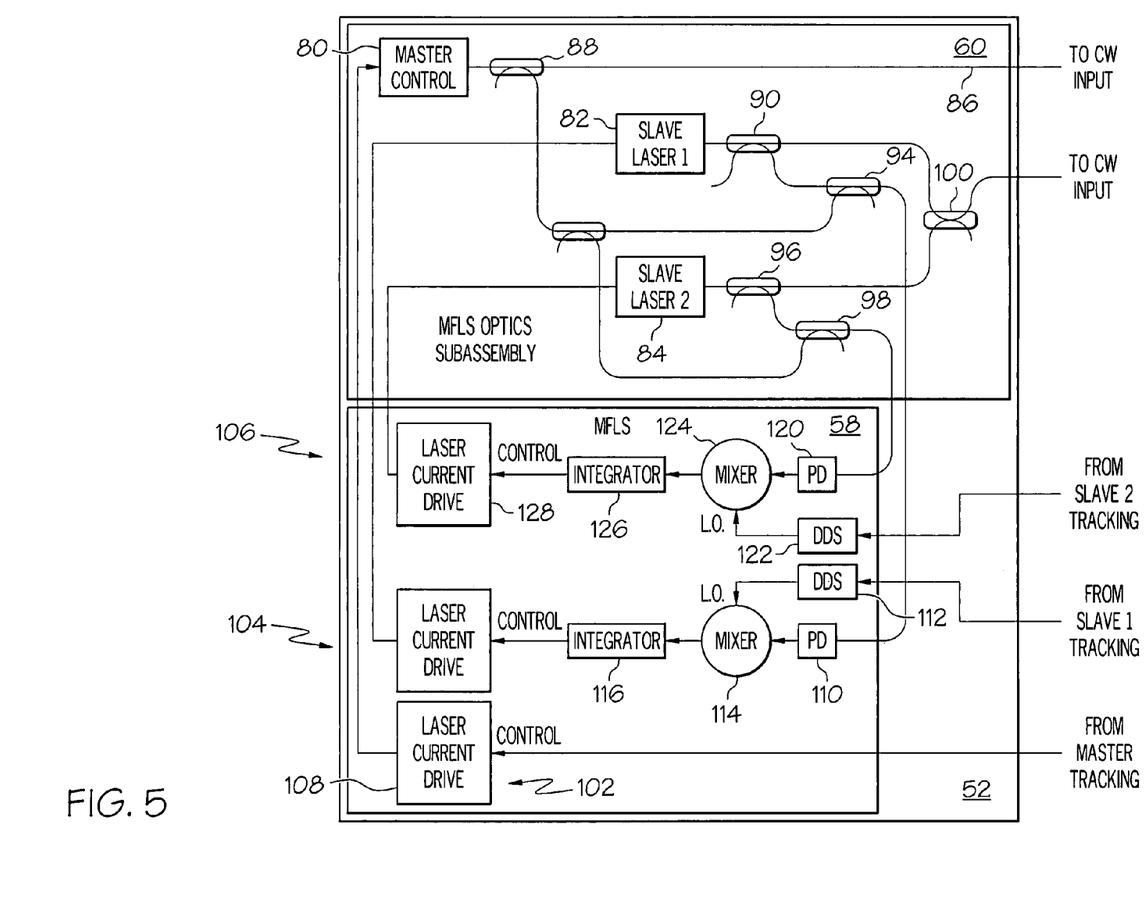
FIG. 5 is a schematic diagram of the multi-frequency laser source assembly shown in FIG. 3.

FIG. 5 is a schematic diagram of the multi-frequency laser source assembly 52 shown in FIG. 3. The MFLS optics subassembly 60 comprises a master laser 80, first and second slave lasers 82, 84, optical couplers 88, 90, 92, 94, 96, 98, 100, and an optical fiber 86 coupled to the outputs of each of the lasers 80, 82, and 84, and between the optical couplers 88, 90, 92, 94, 96, 98, 100. The optical fiber 86 is preferably a polarization maintaining single mode fiber. The master laser 80 produces a CW beam for introduction to the CW input of the resonator 64, and the slave lasers 82, 84 produce CCW beams for introduction to the CCW input of the resonator 64. A portion of each of the CCW beams are combined by the coupler 100 prior to introduction to the CW input of the resonator 64. Some of the optical couplers couple light from the master laser 80 with light from one of the slave lasers 82, 84 to provide feedback for phase locking the slave lasers 82, 84 with the master laser 80. For example, a portion of the CW beam produced by the master laser 80 is mixed with a portion of the CCW beam produced by the first slave laser 82 via the optical couplers 88, 90, 92, and 94, and a portion of the CW beam produced by the master laser 80 is mixed with a portion of the CCW beam produced by the second slave laser 84 via the optical couplers 88, 92, 96, and 98.

This mixed light is provided to the MFLS 58. The MFLS 58 comprises drive circuits 102, 104, and 106 for each of the lasers 80, 82, and 84, respectively. A master drive circuit 102 comprises laser current drive 108 an input configured to receive a master laser control signal from the RTE system 56, shown in FIG. 3, and has an output coupled to the master laser 80. A first slave drive circuit 104 comprises a photodetector 110 having an input coupled to the optical coupler 94, a local oscillator having a direct digital synthesizer (DDS) 112 configured to receive a first slave control signal from the RTE system 56, a mixer 114 having a first input coupled to the DDS 112 and a second input coupled to the photodetector 110, an integrator 116 coupled to an output of the mixer 114, and a laser current drive 118 having an input coupled to the integrator 116 and having an output coupled to the first slave laser 82. A second slave drive circuit 106 comprises a photodetector 120 having an input coupled to the optical coupler 98, a local oscillator having a DDS 122 configured to receive a first slave control signal from the RTE system 56, a mixer 124 having a first input coupled to the DDS 122 and a second input coupled to the photodetector 120, an integrator 126 coupled to an output of the mixer 124, and a laser current drive 128 having an input coupled to the integrator 126 and having an output coupled to the second slave laser 84. A portion of the light from the slave lasers 82, 84 is mixed with a portion of the light from the master laser 80 at the photodetectors 110, 120, respectively, to produce signals having the beat frequencies.

The beat frequencies between the master laser 80 and the slave lasers 82, 84 are mixed by the mixers 114, 124 with local oscillator signals from the DDSs 112, 122, respectively, to drive the integrators 116, 126 controlling the slave laser frequencies via an injection current. The local oscillator signals are variable by the DDSs 112, 122 in response to the slave control signals from the RTE system 56.

Figure 6:
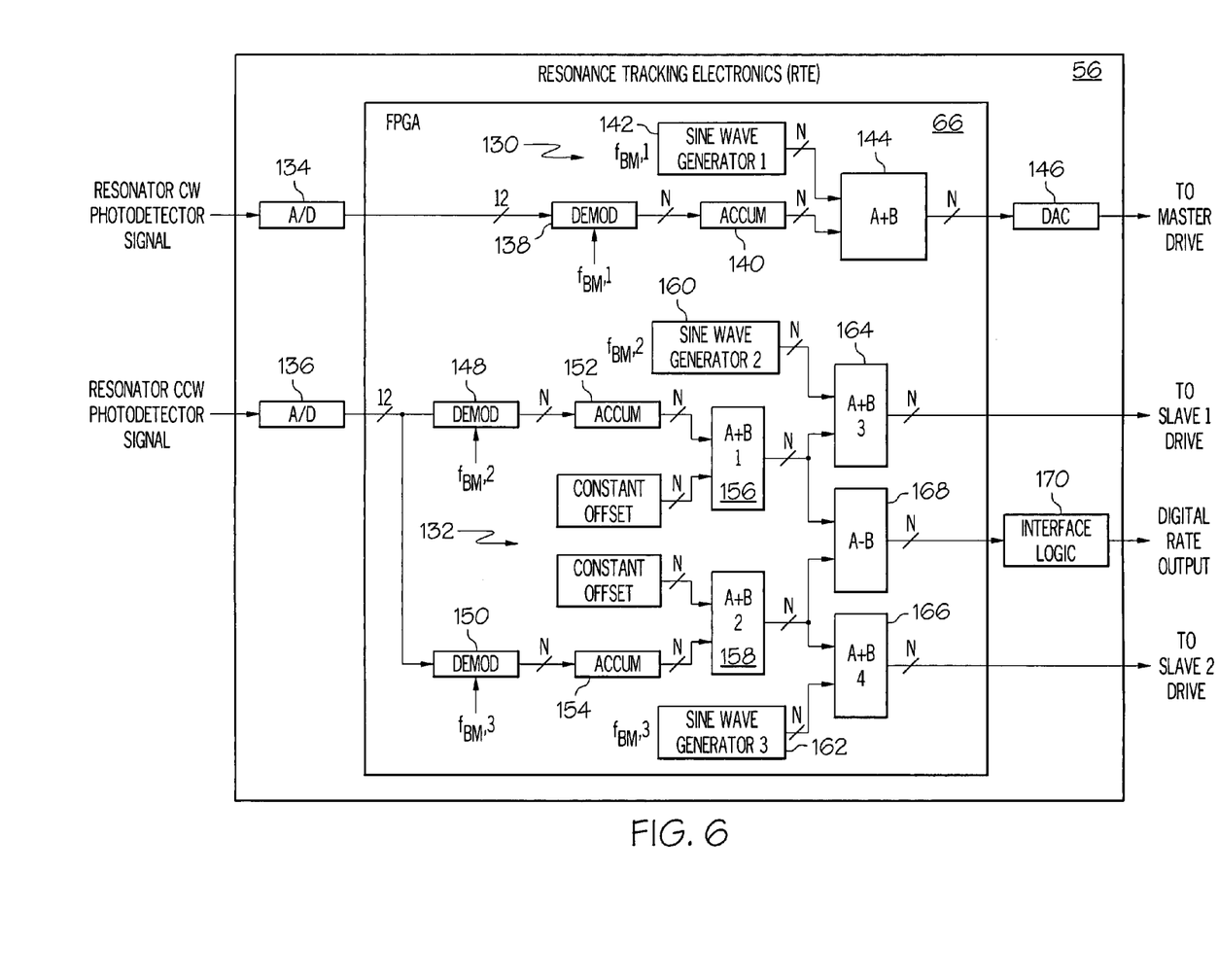
FIG. 6 is a schematic diagram of the resonance tracking electronics system shown in FIG. 3.

FIG. 6 is a schematic diagram of the RTE system 56 shown in FIG. 3. The resonance tracking circuit 66 comprises master and slave tracking subcircuits 130 and 132. In addition to the resonance tracking circuit 66, the RTE system 56 further comprises a first A/D converter 134 coupled to an input of the master tracking circuit 130, a second A/D converter 136 coupled to the slave tracking circuit 132, and a DAC 146 coupled to an output of the master tracking circuit 130. The A/D converters 134 and 136 convert optical data received from the resonator coupling optics 62 (e.g., indicating the resonance frequencies of the CW and CCW directions of the resonator) to digital signals. The DAC 146 converts a digital representation of the resonance frequency of the master laser to an analog signal (e.g., current injection) to transmit to the MFLS 58. In an exemplary embodiment, the resonance tracking circuit 66 is a field programmable gate array (FPGA) or other like programmable device.

The master tracking subcircuit 130 comprises a demodulator 138 coupled to the A/D converter 134 and configured to receive a digitized signal of the CW direction of the resonator 64, an accumulator 140 coupled to the demodulator 138, a sine wave generator 142, and a summing unit 144 having a first input coupled to the sine wave generator 142 and having a second input coupled to the accumulator 140. The demodulator 138 demodulates the digitized signal of the CW direction at a predetermined modulation frequency (e.g., the resonance detection frequency $f_m$ of the CW direction) corresponding to modulation on the light beam generated by the master laser 80. The summing unit 144 generates a signal to adjust the master laser 80 to the resonance center in the CW direction of the resonator 64, and to provide resonance detection modulation at $f_m$ to the master laser 80.

The slave tracking subcircuit 132 comprises first and second demodulators 148, 150 configured to receive a digitized signal of the CCW direction of the resonator 64, coupled to the A/D converter 136, first and second accumulators 152, 154, coupled respectively to the demodulators 148, 150, a first summing unit 156 coupled to the first accumulator 152, a second summing unit 158 coupled to the second accumulator 154, first and second sine wave generators 160, 162, a third summing unit 164 having a first input coupled to the first sine wave generator 160 and having a second input coupled to an output of the first summing unit 156, a fourth summing unit 166 having a first input coupled to the second sine wave generator 162 and having a second input coupled to an output of the second summing unit 158, a difference unit 168 having a first input coupled to the output of the first summing unit 156 and having a second input coupled to the output of the second summing unit 158, and an interface logic 170 coupled to an output of the difference unit 168. The first and second demodulators 148 and 150 demodulate the digitized signal of the CCW direction at predetermined modulation frequencies corresponding to resonance detection modulation frequencies imparted to the first and second slave lasers 82, 84, respectively. The first and second summing units 156, 158 provide a constant but tunable and commandable offset (e.g., corresponding to one FSR) to each of the demodulated CCW signals, and the third and fourth summing 164, 166 generate signals for adjusting the frequencies of each of the slave lasers 82, 84 based on the respective resonance frequencies in the CCW direction (e.g., one FSR below the resonance frequency of the CW direction and one FSR above the resonance frequency of the CW direction) and imparts the resonance detection modulation to each of the lasers 82, 84. The difference unit 168 removes the constant offset (e.g., FSR) from the CCW signals and produces a signal corresponding to the rotational rate of the resonator gyro 50.

Advantages of the resonator gyros 10 and 50 include, but are not limited to: a capability of providing about a 0.01 deg/hr bias and about a 0.001 deg/root-hr angle random walk (ARW) in a low-cost, small-sized package; a resonator having less than a few meters of fiber wound into tight turns with low loss; use of a high reflectivity mirror rather than a fiber optic coupler to recirculate light in the ring resonator; a compact, stable laser whose key components are mounted on a silicon optical bench; minimized non-linear effects in silica fibers that may promote gyro errors; substantial reduction of light loss at transition point to optical fiber coil 24; a capability of winding the optical fiber coil into a very tight (e.g., pencil diameter) loops with little to no change in light transmission properties.

In an exemplary embodiment, the resonator gyros 10 and 50 are constructed on a silicon-based micro-optical bench that integrates electronics and optics and provides an efficient, expedient, and mechanically stable interface between the two. Miniature optical components having a feature size of as little as 10 microns may be mounted on silicon surfaces to eliminate large bulk optics, even though the light wave may be traveling in free space. Laser diodes and external elements for stabilizing their frequency may also be mounted on the top surface of the silicon optical bench. In this exemplary embodiment, the laser diodes and related frequency tuning components may be mounted on the optical bench. Several features of external-cavity lasers may be placed or directly formed on the silicon chip. The resonator gyros 10 and 50 use progressively narrower spectral-width lasers to improve the signal to noise accuracy. As such, some conventional laser diodes possess excessively wider linewidths, creating the need to narrow this linewidth by placing such laser diodes in an external cavity. This can be compactly accommodated on the silicon substrate by forming or placing high reflectivity mirrors on the substrate and inserting a laser diode in between such mirrors. Thus, a compact external cavity, narrow linewidth laser diode may be produced.

Further, the laser diode preferably emits light at a single frequency. A frequency selective element may be inserted into the external cavity to create more loss for undesired emission frequencies and cause the laser to emit light of narrow linewidth at only a single center wavelength. There are many frequency selective elements that may be used. For example, the frequency selective element may be a miniature grating, either formed or placed on the substrate, or an etalon formed or placed on the grating. Other features of the resonator gyro may be realized on the silicon substrate. For example, the mirror-recirculators may be placed, formed, or etched on the surface and may be aligned to the fibers by locating fibers in precisely formed and positioned V-grooves. The detectors may also be precisely positioned to the resonator output beams using planar lithographical processes to locate mounting features for placing detectors on the surface. Alternatively, the detectors may be formed on the surface by doping silicon with a dopant, such as germanium for detector operation at about 1.3 µm or about 1.5 µm wavelengths. Even the laser diode may be integrated on the silicon platform, such as by using hybrid techniques to grow doped InGaAsP layers on silicon (e.g., using a secondary substrate to facilitate the formation of doped InGaAsP layers on the silicon surface). The use of these techniques allows the fabrication of optics in a silicon platform and thus integrated with the electronics.

The resonator gyros 10 and 50 are suited to a variety of applications including, by way of example and not of limitation, applications requiring inertial guidance such as aircraft, land vehicle, submarine, satellite, surface ship navigation, and the like. In addition, the relatively small size envisioned for the resonator gyros 10 and 50 would enable a practical usage on very small platforms including, by way of example and not of limitation, small robots, individual soldier footwear, and small-scale satellites.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An optical gyro comprising:
    at least one substrate;
    a multi-frequency light source (MFLS) mounted on said at least one substrate and configured to produce a first light beam having a first frequency and a second light beam having a second frequency, said first light beam phase locked with said second light beam; and
    a resonator coupled to said MFLS, said resonator having first and second counter-propagating directions and comprising an optical fiber coil having a hollow core, said resonator configured to circulate a portion of each of said first and second light beams through said hollow core, said portion of said first light beam propagating in said first counter-propagating direction, said portion of said second light beam propagating in said second counter-propagating direction, a difference between said first and second frequencies indicating a frequency shift proportional to a rotation rate of the optical gyro.

2. An optical gyro according to claim 1 further comprising a sensor coupled to said resonator and configured to determine said frequency shift.

3. An optical gyro according to claim 2 further comprising a tracking circuit coupled to said sensor and said MFLS, said tracking circuit configured to offset said second frequency from said first frequency by a tunable and controllable offset.

4. An optical gyro according to claim 1, wherein said MFLS comprises:
    a first external cavity laser configured to produce said first light beam; and
    a second external cavity laser configured to produce said second light beam.

5. An optical gyro according to claim 3, wherein said sensor is further configured to:
    determine a first resonance frequency of said first counter-propagating direction based on said portion of said first light beam; and
    determine a second resonance frequency of said second counter-propagating direction based on said portion of said second light beam; and
    wherein said tunable and controllable offset is based on a free spectral range (FSR) from said first counter-propagating direction.

6. An optical gyro according to claim 3, wherein said MFLS is further configured to produce a third light beam phase locked with said first light beam, said third light beam having a third frequency, and wherein said resonator is further configured to circulate a portion of said third light beam through said hollow core in said second counter-propagating direction.

7. An optical gyro according to claim 6, wherein said sensor is further configured to:
    determine a first resonance frequency of said first counter-propagating direction based on said portion of said first light beam;
    determine a second resonance frequency of said second counter-propagating direction based on said portion of said second light beam; and
    determine a third resonance frequency of said second counter-propagating direction based on said portion of said third light beam;
    wherein a first difference based on a second difference between said first resonance frequency and said second resonance frequency and a third difference between said first resonance frequency and said third resonance frequency is proportional to said rotation rate of the optical gyro.

8. An optical gyro according to claim 6, wherein said tracking circuit is further configured to:
add said tunable and controllable offset to said second frequency, said tunable and controllable offset based on an FSR from said first counter-propagating direction; and
subtract said tunable and controllable offset from said third frequency.

9. An optical gyro according to claim 8, wherein said MFLS comprises:
a first external cavity laser configured to produce said first light beam;
a second external cavity laser configured to produce said second light beam; and
a third external cavity laser configured to produce said third light beam.

10. An optical gyro according to claim 1, wherein said at least one substrate is selected from the group consisting of silicon, silicon-on-insulator, and InGaAsP.

11. An optical gyro according to claim 1, wherein said MFLS comprises at least one single frequency laser diode mounted on said at least one substrate; and
wherein said resonator comprises a minor mounted on said at least one substrate,
said minor configured to circulate said portions of each of said first and second light beams in said hollow core.

12. An optical gyro comprising:
at least one substrate;
first and second light sources mounted on said at least one substrate, said first light source configured to produce a first input beam having a first frequency, said second light source configured to produce a second input beam having a second frequency;
a resonator coupled to said first and second light sources and comprising an optical fiber coil having a hollow core and first and second ends coupled to said at least one substrate, said optical fiber coil configured to direct a portion of said first input beam in a first counter-propagating direction of said resonator and further configured to direct a portion of said second input beam in a second counter-propagating direction of said resonator; and
a sensor configured to detect a first resonance frequency of said first counter-propagating direction and further configured to detect a second resonance frequency of said second counter-propagating direction, a difference between said first resonance frequency and said second resonance frequency proportional to a rotational rate of the optical gyro,
wherein each of said first and second light sources comprises:
an external cavity laser diode configured to produce a light beam; and
a frequency-selective element coupled to said external cavity laser diode and configured to select a frequency of said light beam.

13. An optical gyro according to claim 12, wherein said resonator comprises:
a first minor mounted to said at least one substrate and configured to allow introduction of said portion of said first input beam into said hollow core via said first end; and
a second minor mounted to said at least one substrate and configured to introduce said portion of said second input beam into said hollow core via said second end.

14. An optical gyro according to claim 12, wherein said resonator further comprises a piezoelectric transducer (PZT) hub at least partially encircled by said optical 18 fiber coil, said PZT hub configured to sinusoidally stretch said optical fiber coil at a predetermined modulation frequency.

15. An optical gyro according to claim 13, wherein said resonator is further configured to circulate a first circulating beam based on said portion of said first input beam and further configured to circulate a second circulating beam based on said portion of said second input beam; and
wherein said sensor comprises:
a first detector configured to detect said first resonance frequency from a portion of said first circulating beam; and
a second detector configured to detect said second resonance frequency from a portion of said second circulating beam.

16. An optical gyro comprising:
at least one substrate;
first, second, and third lasers mounted on said at least one substrate, said first laser configured to produce a first light beam having a first frequency, said second laser configured to produce a second light beam having a second frequency, said third laser configured to produce a third light beam having a third frequency;
an optics subsystem mounted on said at least one substrate and configured to phase lock said second and third lasers with said first laser;
a resonator having first and second counter-propagating directions, said first counter-propagating direction having a first resonance frequency, and said second counter-propagating direction having a second resonance frequency, said resonator configured to circulate a portion of each of said first, second, and third light beams, said resonator comprising an optical fiber coil having a hollow core, said portion of said first light beam circulating in said first counter-propagating direction through said hollow core, and said portions of said second and third light beams circulating in said second counter-propagating direction through said hollow core, said first frequency tuned to said first resonance frequency, said second frequency tuned to a first tunable and controllable offset from said second resonance frequency, and said third frequency tuned to a second tunable and controllable offset from said second resonance frequency.

17. An optical gyro according to claim 16, wherein said optics subsystem comprises a coupler configured to:
couple said first light beam with said second light beam;
couple said first light beam with said third light beam; and
couple said second light beam with said third light beam.

18. An optical gyro according to claim 16 further comprising a tracking circuit coupled to said resonator and said first, second, and third lasers, said tracking circuit configured to:
tune said first frequency to said first resonance frequency;
tune said second frequency to said first tunable and controllable offset from said second resonance frequency; and
tune said third frequency to said second tunable and controllable offset from said second resonance frequency.

19. An optical gyro according to claim 18, wherein said first and second tunable and controllable offsets are each based on one FSR from said first resonance frequency.

* * * * *